United States Patent Office 3,775,453
Patented Nov. 27, 1973

3,775,453
PREPARATION OF HEXAFLUOROISOPROPOXIDES OF ALUMINUM AND GROUP IV ELEMENTS
Khodabakhsh S. Mazdiyasni, Xenia, Barbara J. Schaper, Enon, and Leanne M. Brown, Brookville, Ohio; said Schaper and said Brown assignors to the United States of America as represented by the Secretary of the Air Force
No Drawing. Filed Mar. 14, 1972, Ser. No. 234,674
Int. Cl. C07f 7/00, 7/28, 5/06
U.S. Cl. 260—429 R               5 Claims

ABSTRACT OF THE DISCLOSURE

Hexafluoroisopropoxides of aluminum, silicon, germanium, titanate, zirconium and hafnium are prepared by reacting the chloride of one of the foregoing elements with sodium or potassium hexafluoroisopropoxide in the presence of hexafluoro-2-propanol. The fluoro-substituted compounds obtained are useful as catalysts in polymerization reactions and in the preparation of high purity oxides by thermal or hydrolytic decomposition of the compound. The compounds can also be used in the preparation of high temperature polymers, fluids and lubricants.

FIELD OF THE INVENTION

This invention relates to a process for preparing fluoro-substituted alkoxides of aluminum, silicon, germanium, titanium, zirconium and hafnium. In one aspect, it relates to a process for preparing the fluoro-substituted isopropoxides of these elements and to the compounds per se.

BACKGROUND OF THE INVENTION

A study of the literature has failed to reveal any information regarding the preparation of pure fluoro-substituted metal alkoxides. The use of anhydrous ammonia in preparing non-fluorinated alkoxides of metals of Groups IVb and V, uranium and iron is disclosed in U.S. Pat. No. 2,187,821 (1940) and British Pat. No. 512,452 (1939). More recently, there have been reports in the literature of the extension of the ammonia method to the preparation of 2,2,2-trifluoroethoxides of some Group IV and Group V elements and to the preparation of 1,1,1,3,3,3-hexafluoroisopropoxides of the same elements. Attempts to synthesize either aluminum or any of the Group IV metal hexafluoroisopropoxides by the ammonia method produced only poor yields. Furthermore, the products contained metal, fluorinated alkoxides, and in most instances two molecules of ammonia. Moreover, the ammonia was bonded so strongly as to prevent its loss during vacuum sublimation or fractional distillation at relatively high temperatures. It was concluded from this work that diammoniates of the metal fluoroalkoxide were formed rather than the uncomplexed metal fluoroalkoxides.

It is an object of this invention, therefore, to provide a process for preparing fluoro-substituted alkoxides of aluminum and elements of Group IV of Mendeleev's Periodic Table.

A further object of the invention is to provide a process for preparing pure hexafluoroisopropoxides of aluminum and certain Group IV elements.

Another object of the invention is to provide pure hexafluoroisopropoxides of aluminum and certain Group IV elements.

Other objects and advantages of the invention will become apparent to those skilled in the art upon consideration of the accompanying disclosure.

SUMMARY OF THE INVENTION

The present invention resides in the discovery that hexafluoroisopropoxides of aluminum, silicon, germanium, titanium, zirconium and hafnium can be prepared by reacting the chloride of one of the aforementioned elements with sodium or potassium hexafluoroisopropoxide in the presence of hexafluoro-2-propanol(1,1,1,3,3,3-hexafluoro-2-propanol) (HFIP) as the reaction medium.

The reaction involved in carrying out the process of this invention can be represented by the following equation:

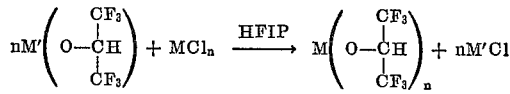

where M' is sodium or potassium; M is aluminum, silicon, germanium, titanium, zirconium or hafnium; and $n$ is a whole number equal to the valence of the element M.

As indicated in the above equation, stoichiometric amounts of the sodium or potassium compound and the chloride are utilized in the reaction. Thus, the mol ratio of the sodium or potassium compound to the chloride is 3 or 4, i.e., the valence of the element M, to 1. The amount of HFIP used is not critical, being merely sufficient to dissolve the reactants and permit refluxing of the reaction mixture.

In a preferred procedure, the sodium or potassium compound is added to the alcohol (HFIP) after which the chloride is slowly introduced. The resulting mixture is then refluxed in an inert atmosphere at a temperature of about 57.5 to 58° C. for a period sufficient to permit the reactants to react. As an inert atmosphere, helium, argon, nitrogen, and the like can be employed. In general, a reflux period ranging from about 2 to 4 hours is adequate although longer times can be employed. After the reflux period, the reaction mixture is cooled to room temperature and then filtered. Thereafter, the filtrate is concentrated by evaporating off the alcohol solvent, thereby yielding a crude product. Evaporation of the solvent is accomplished by heating the reaction mixture at about 58° C., the boiling point of the HFIP.

The crude product obtained after evaporation of the solvent is then purified. Purification of the crude product can be accomplished by dissolving the product in hot HFIP. Upon cooling, e.g., to room temperature, the product recrystallizes and is then recovered, as by filtration or decantation, in a purified state. If desired, the foregoing procedure can be repeated in order to ensure that all impurities are removed. Another method for purifying the crude product is by vacuum sublimation. In addition to the fact that process of this invention provides a high purity product, it is also characterized by the high product yields, e.g., as high as 95 percent, that are obtainable.

Because of the high purity of the hexafluoroisopropoxides prepared by the process of this invention, they are particularly useful as precursors in making high purity submicron oxide powders by thermal or hydrolytic decomposition. The metal oxides so prepared are useful as pigments and fillers as well as catalyst components.

A more complete understanding of the invention can be obtained by referring to the following illustrative examples which are not intended, however, to be unduly limitative of the invention.

EXAMPLE I

A run was conducted in which aluminum tris(hexafluoroisopropoxide) [Al(HFIP)₃] was prepared by reacting sodium hexafluoroisopropoxide [Na(HFIP)] with aluminum chloride (AlCl₃) in the presence of HFIP. As obtained, the HFIP solvent had a boiling point of 57–58° C. The solvent was distilled over sodium using a 70-cm.

Vigreux column, and the center fraction having a boiling point of 57.5° C. was collected and stored in a dark container. All other chemicals, which were reagent grade, were dried over a Linde activated molecular sieve before being used.

The run was conducted in glass apparatus with ground-glass joints under an atmosphere of an inert gas (dry helium). Compounds were handled in an inert atmosphere and were stored in an evacuated desiccator over phosphorous pentoxide.

In carrying out the run, 57.01 grams (0.3 mol) of Na(HFIP) was added to 100 ml. of HFIP. To the resulting solution, 13.33 grams (0.1 mol) of AlCl₃ was slowly added. The reaction mixture was refluxed under a helium atmosphere for 2 hours and then allowed to cool to room temperature. After the reaction mixture had stood overnight, it was filtered. The filtrate was then concentrated by evaporation of the solvent which was accomplished by heating the reaction mixture at a temperature of about 58° C. A 75 percent yield of crude Al(HFIP)₃ was obtained. The crude product was purified by recrystallization from boiling HFIP. The pure Al(HFIP)₃ that was recovered was in the form of white crystals which melted at 175° C. Elemental analysis of the product gave the following results:

|  | Percent | | | |
| --- | --- | --- | --- | --- |
|  | Carbon | Hydrogen | Fluorine | Al |
| Calculated | 20.48 | 0.57 | 64.75 | 5.11 |
| Found | 20.17 | 0.72 | 63.80 | 5.50 |

EXAMPLE II

A series of runs was conducted in which tetrakis (hexafluoroisopropoxides) of silicon [Si(HFIP)₄], germanium [Ge(HFIP)₄], titanium [Ti(HFIP)₄], zirconium [Zr(HFIP)₄], and hafnium [Hf(HFIP)₄] were prepared. Except as noted hereinafter, the same procedure as described in Example I was followed in conducting the runs. The amount of the solvent HFIP used was 100 ml. while the amounts of the reactants are shown below in Table I.

TABLE I

| Run number | Reactants | Amount | Mols |
| --- | --- | --- | --- |
| 1 | Na(HFIP) | 76.01 g. | 0.4 |
|  | SiCl₄ | 11.5 ml. | 0.1 |
| 2 | Na(HFIP) | 76.01 g. | 0.4 |
|  | GeCl₄ | 11.6 ml. | 0.1 |
| 3 | Na(HFIP) | 76.01 g. | 0.4 |
|  | TiCl₄ | 11.0 ml. | 0.1 |
| 4 | Na(HFIP) | 76.01 g. | 0.4 |
|  | ZrCl₄ | 23.30 g. | 0.1 |
| 5 | Na(HFIP) | 76.01 g. | 0.4 |
|  | HfCl₄ | 32.03 g. | 0.1 |

In run 1, the Si(HFIP)₄ product was a clear liquid which was vacuum distilled at 158° C., giving a yield of 80 percent. The product from run 2 [Ge(HFIP)₄] was also a clear liquid which was vacuum distilled at 145° C. to give a 60 percent yield. After standing for several days, the product crystallized. From run 3 the product obtained [Ti(HFIP)₄] was a clear liquid which was vacuum distilled at 35° C. to give a 40 percent yield. The Zr(HFIP)₄ product from run 4 was a white solid which was recrystallized from boiling HFIP. The product melted at 111° C., and the yield was 95 percent. In run 5 the Hf(HFIP)₄ product was also a white solid which was recrystallized from boiling HFIP. The product melted at 110° C., and the yield was 80 percent.

Elemental analysis of the products of the five runs gave the results shown in Table II.

TABLE II

| Run number | Compound[1] | | Percent | | | |
| --- | --- | --- | --- | --- | --- | --- |
|  |  |  | Carbon | Hydrogen | Fluorine | Metal |
| 1 | Si(HFIP)₄ | Calculated | 20.69 | 0.58 | 58.48 | 4.03 |
|  |  | Found | 20.78 | 0.69 | 66.90 | 5.12 |
| 2 | Ge(HFIP)₄ | Calculated | 19.46 | 0.54 | 61.52 | 8.80 |
|  |  | Found | 19.07 | 0.75 | 61.32 | 10.08 |
| 3 | Ti(HFIP)₄ | Calculated | 19.90 | 0.72 | 64.67 | 6.69 |
|  |  | Found | 19.02 | 0.53 | 60.19 | 6.65 |
| 4 | Zr(HFIP)₄ | Calculated | 19.07 | 0.69 | 59.40 | 12.04 |
|  |  | Found | 17.02 | 0.48 | 53.80 | 12.06 |
| 5 | Hf(HFIP)₄ | Calculated | 17.02 | 0.48 | 53.80 | 21.08 |
|  |  | Found | 16.04 | 0.63 | 53.55 | 21.00 |

[1] Analyses for chlorine and sodium were negative.

EXAMPLE III

A run was conducted in which it was attempted to prepare Zr(HFIP)₄ by the ammonia method. In carrying out the run, 23.30 grams of ZrCl₄ was added to 67.2 ml. of HFIP in 100 ml. of benzene. Ammonia was bubbled into the solution for a period of 4 hours after which the reaction mixture was filtered and distilled. The product was a clear viscous liquid which was distilled under a vacuum at 110° C. The product obtained was $$Zr(HFIP)_4 \cdot 2NH_3$$

as indicated by the following results of the elemental analysis:

|  | Percent | | | | |
| --- | --- | --- | --- | --- | --- |
|  | Carbon | Hydrogen | Fluorine | Metal | Nitrogen |
| Calculated | 18.12 | 1.02 | 57.32 | 11.47 | 3.52 |
| Found | 18.00 | 1.07 | 57.33 | 11.52 | 3.92 |

The data shown in the foregoing examples demonstrate that the present invention provides a process for preparing pure hexafluoroisopropoxides of aluminum and certain Group IV elements. Taking into consideration the hygroscopic nature of these compounds (with the exception of Si(HFIP)₄ which is insensitive to moisture), the carbon, hydrogen, fluorine and metal analyses were in good agreement with the calculated values. As seen from Example III, the ammonia method of the prior art is incapable of producing products which are free of ammonia.

As will be evident to those skilled in the art, various modifications of this invention can be made in view of the foregoing disclosure without departing from the spirit or scope of the invention.

We claim:

1. A process for preparing hexafluoroisopropoxides of aluminum, silicon, germanium, titanium, zirconium and hafnium which comprises reacting sodium or potassium hexafluoroisopropoxide with a chloride of aluminum, silicon, germanium, titanium, zirconium or hafnium in the presence of hexafluoro-2-propanol, stoichiometric amounts of sodium or potassium hexafluoropropoxide and the chloride being utilized in the reaction.

2. The process according to claim 1 in which the sodium or potassium hexafluoroisopropoxide is initially added to the hexafluoro-2-propanol; the chloride is then introduced; the resulting reaction mixture is refluxed for a period of about 2 to 4 hours; the reaction mixture is cooled to room temperature; the cooled reaction mixture is filtered; and a filtrate is recovered.

3. The process according to claim 2 in which the filtrate is heated, thereby evaporating the hexafluoro-2-propanol; and a crude product is recovered.

4. The process according to claim 3 in which the crude product is dissolved in boiling hexafluoro-2-propanol; the resulting solution is cooled, thereby causing a pure hexafluoroisopropoxide of aluminum, silicon, germanium, titanium, zirconium or hafnium to crystallize; and the pure hexafluoroisopropoxide is separated from the hexafluoro-2-propanol.

5. The process according to claim 3 in which the crude product is purified by vacuum sublimation.

References Cited

UNITED STATES PATENTS

| | | | |
|---|---|---|---|
| 3,494,946 | 2/1970 | Skelcey et al. | 260—429 R |
| 3,505,368 | 4/1970 | Skelcey et al. | 260—429 R |
| 3,631,081 | 12/1971 | Huggins et al. | 260—429 R |

OTHER REFERENCES

Kapoor et al.: Chem. and Ind. (London) 1968, p. 1314.
Kapoor et al.: Chem. and Ind. (London) 1666, p. 1034.

DANIEL E. WYMAN, Primary Examiner

A. P. DEMERS, Assistant Examiner

U.S. Cl. X.R.

260—429.3, 429.5, 448 AO, 448.8 A